United States Patent
Ekström et al.

(10) Patent No.: US 8,200,236 B2
(45) Date of Patent: Jun. 12, 2012

(54) METHOD AND APPARATUS FOR TRIGGERING A STATE CHANGE FOR A COMMUNICATION DEVICE

(75) Inventors: Hannes Ekström, Stockholm (SE); Reiner Ludwig, Hürtgenwald (DE); Pontus Wallentin, Linköping (SE); Béla Rathonyi, Lomma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 695 days.

(21) Appl. No.: 12/280,958

(22) PCT Filed: Feb. 27, 2006

(86) PCT No.: PCT/SE2006/050015
§ 371 (c)(1),
(2), (4) Date: Mar. 27, 2009

(87) PCT Pub. No.: WO2007/097670
PCT Pub. Date: Aug. 30, 2007

(65) Prior Publication Data
US 2009/0181685 A1    Jul. 16, 2009

(51) Int. Cl.
*H04M 9/00*     (2006.01)
*H04W 72/00*    (2009.01)
*H04B 7/00*     (2006.01)
*H04B 1/38*     (2006.01)

(52) U.S. Cl. ........ 455/450; 455/401; 455/453; 455/509; 455/558

(58) Field of Classification Search .......... 455/410–411, 455/414.1, 414.3, 415, 418–421, 423, 432.3, 455/434, 435.1, 456.1–456.5, 401, 425, 450, 455/452.2, 453, 456.3, 456.6, 466, 509, 517, 455/550.1, 556.2, 557–558, 560–561; 709/202–203, 709/225–226, 228–229, 235; 714/47.1–47.3, 714/51, 55; 379/93.92–93.94; 370/261–262, 370/395.21

See application file for complete search history.

(56) References Cited

U.S. PATENT DOCUMENTS

| | | | | |
|---|---|---|---|---|
| 6,112,101 A * | 8/2000 | Bhatia et al. | .................. | 455/512 |
| 6,728,783 B1 * | 4/2004 | Scott et al. | ...................... | 709/243 |
| 6,745,032 B1 * | 6/2004 | Alvesalo et al. | .............. | 455/436 |
| 7,020,098 B2 * | 3/2006 | Ehrsam et al. | ................ | 370/260 |
| 7,076,467 B1 * | 7/2006 | Chatani | ........................... | 705/52 |
| 7,161,914 B2 * | 1/2007 | Shoaib et al. | ................. | 370/331 |
| 7,343,396 B2 * | 3/2008 | Kausik et al. | ................. | 709/217 |
| 7,526,541 B2 * | 4/2009 | Roese et al. | ................. | 709/223 |
| 7,721,296 B2 * | 5/2010 | Ricagni | ........................ | 719/318 |
| 7,813,741 B2 * | 10/2010 | Hendrey et al. | ............. | 455/456.1 |

FOREIGN PATENT DOCUMENTS

| JP | 2003-204574 A | 7/2003 |
|---|---|---|
| WO | WO 2005/018201 A1 | 2/2005 |
| WO | WO 2005/117295 A1 | 12/2005 |
| WO | WO 2006/012377 A1 | 2/2006 |

* cited by examiner

Primary Examiner — Meless Zewdu

(57) ABSTRACT

The invention aims to reduce the delay associated with setting up a session for a user terminal in a mobile communication network. A control unit for use in a wireless communication network for controlling a user terminal's ability to communicate with the network, comprising—at least one input for receiving event information about at least one trigger event indicating that the user terminal is likely to wish to communicate with the network within a predetermined period of time—decision logic for deciding whether the state of the terminal should be changed to enable it to communicate and—output means for triggering the a state change for the terminal to a state in which the terminal is able to communicate with the network, if the decision logic decides that this should be done.

15 Claims, 2 Drawing Sheets

METHOD AND APPARATUS FOR TRIGGERING A STATE CHANGE FOR A COMMUNICATION DEVICE

TECHNICAL FIELD

The present invention relates to wireless telecommunications networks and in particular to making the communication in such networks more efficient.

BACKGROUND AND PRIOR ART

In many wireless communications systems, such as the Universal Mobile Telecommunications Systems (UMTS), the process of allocating resources to a user entails extensive signalling and negotiation between the user terminal and different network nodes. These procedures are time consuming, adding considerable delay to the service setup times.

Further, in order to use network resources as efficiently as possible, different states are typically defined for the terminals in wireless networks. A terminal that is not currently engaged in a communication session can assume a state in which the use of power in the terminal and network resources such as memory and power is reduced. In such a state, the need for signalling between the terminal and network, that arises, for example because of mobility is also reduced. When a communication session is initiated the terminal's state must be changed, which is time consuming and poses a delay in the session establishment.

In fixed broadband networks, such as Ericsson's Public Ethernet solution, a different approach is taken. There, the network keeps network resources pre-allocated to the user, even before the user requests a service to be initiated.

The advantage of the latter approach is that it removes the need for time consuming resource allocation signalling when a communication session is to be set up. Therefore, the response time is shorter from service invocation until the data transfer starts. The drawback of this approach is that resources, such as buffers, memory for storing user contexts, etc., are allocated both in the network and in the user terminals, even when no communication takes place.

OBJECT OF THE INVENTION

It is an object of the invention to reduce the delay associated with setting up a session for a user terminal in a mobile communication network.

SUMMARY OF THE INVENTION

This object is achieved according to the present invention by a control unit for use in a wireless communication network for controlling a user terminal's ability to communicate with the network, characterized in that it comprises
- at least one input for receiving event information about at least one trigger event indicating that the user terminal is likely to wish to communicate with the network within a predetermined period of time
- decision logic for deciding whether the state of the terminal should be changed to enable it to communicate and
- output means for triggering the a state change for the terminal to a state in which the terminal is able to communicate with the network, if the decision logic decides that this should be done.

The object is also achieved by a method in a wireless communication network comprising the steps of
- detecting at least one trigger event related to a user terminal, indicating that the user terminal is likely to wish to communicate with the network within a predetermined period of time,
- deciding, based on the at least one trigger event, that the user terminal's state should be change to a state in which it is able to communicate with the network
- changing the state of the terminal to a state in which it is able to communicate with the network, if it is decided in the previous step that the state should be changed.

In this way, the state change required to enable a terminal to communicate can be carried out before the user actually starts performing the functions for initiating communication. Thus, the delay in the set-up procedure experienced by the user can be reduced.

Thus, according to the invention the time needed to set up a connection from a user terminal can be reduced in many cases, while striving to keep the amount of resources consumed in the network and in the terminal low.

This is achieved, by using additional information, related to trigger events, or the activities of the user terminal, as input to the decision logic. The additional information could, for example, concern user activity, the user's current location and/or the load in the network.

Hence, the advantage of the inventive approach is that it removes the need for time-consuming resource allocation signalling when the user decides to initiate a communication session. Therefore, the user gets shorter response times from the service invocation until the data transfer starts. The drawback of this approach is that resources such as buffers, memory for storing user contexts, etc. are allocated both in the network and in the user terminal, and the amount of signalling caused by the mobility can be increased. According to the invention a compromise is made between the desire to reduce the response time and the desire to minimize the use of resources when the terminal is not involved in a communication session.

The control unit according may comprise at least one input for load information about the current traffic load in the network, in which case the decision logic is arranged to consider said load information when deciding.

The at least one trigger event may concern the terminal's geographical location, and/or an activity performed by the terminal.

The at least one trigger event may also be based on the terminal's previous behaviour.

The control unit may further comprise an output for triggering the establishment of at least one bearer for the terminal when the decision logic determines that the state of the terminal should be changed. In this way, one of more bearers may be pre-established for a user terminal when the decision logic determines that it is likely to start communication shortly. This means that a bearer will be established before it has actually been requested by the terminal or is necessitated by a call made to the terminal. Thus, the delay experienced by the user will be reduced even further.

The control unit may be placed in or in connection with any unit in the wireless communication network, depending on the input it is arranged to receive and the functions it is arranged to control. For example, the control unit may be arranged to be included in a unit that manages bearer set-up functions in the wireless communication network, such as a PCRF unit. Alternatively, the control unit may be arranged to be included in a unit that manages radio resource functions in the wireless communication network, such as an RNC unit. Of course, control units may be placed in both these nodes, and other nodes in the network as well.

The invention also relates to a wireless communication network characterized in that it comprises at least one control unit as described above.

Acronyms and Abbreviations
CPCH Common Packet Channel
DCH Dedicated Channel
DPCH Dedicated Physical Channel
DSCH Downlink Shared Channel
FACH Forward Access Channel
PCH Paging Channel
PCRF Policy Charging Rules Function
RAB Radio Access Bearer
RACH Random Access Channel
RB Radio Bearer
RNC Radio Network Controller
RRC Radio Resource Control
UMTS Universal Mobile Telecommunications System
URA UTRAN Routing Area
UTRAN UMTS Terrestrial Radio Access Network
WCDMA Wideband Code Division Multiple Access

BRIEF DESCRIPTION OF THE DRAWINGS

The invention will be described in more detail in the following, by way of example and with reference to the appended drawings in which.

DETAILED DESCRIPTION OF EMBODIMENTS

Figure 1:
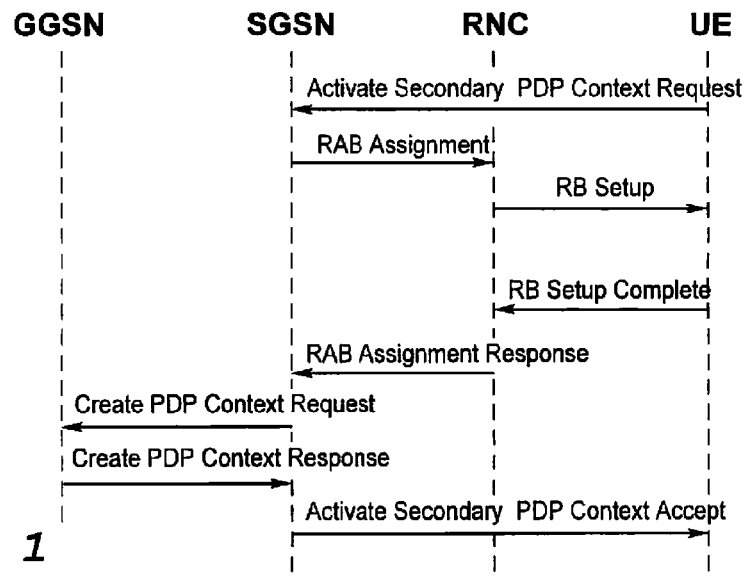
FIG. 1 illustrates the signalling diagram that is used to set up the different bearers that must be set up in order for a data transfer to start between a user terminal in a UMTS network and the network itself.

FIG. 1 illustrates signalling between different entities in a UMTS network with the intention of enabling data transfer between a user terminal and the UMTS network. This procedure, as well as the units involved, are well known to the skilled person. As can be seen, the signalling carried out for the establishment of the bearers needed to establish a communication session is extensive. Thus, it bears the risk of being time consuming thereby incurring a considerable a delay in the session establishment.

Four different units are involved in the signalling in FIG. 1.

A Gateway GPRS Support Node (GGSN) forms an interface between the UMTS network and other packet data networks, such as the Internet.

One or more Serving GPRS Support Nodes (SGSN) provide GPRS functions in the network.

A Radio Network Controller (RNC) controls radio resources in the network.

The user equipment UE is a mobile terminal used by a subscriber in the network.

Only one unit of each type is shown; however, of course the network may comprise several units of the same type.

According to the procedure shown in FIG. 1, the terminal UE first sends an activate the secondary PDP Context request to the SGSN. The SGSN responds by sending a Radio Access Bearer (RAB) assignment to the RNC, which in its turn sends a Radio Bearer (RB) setup message to the terminal. The terminal confirms the setup by sending an RB setup complete message to the RNC, which then sends a RAB assignment response message to the SGSN. The SGSN sends a Create Packet Data Protocol (PDP) Context Request to the GGSN, which responds by a Create PDP Context Response message. Upon receipt of this message the SGSN sends an Activate Secondary PDP Context Accept message to the terminal UE. The layout and meaning of these messages are known to the skilled person, and are well defined in the relevant 3GPP specifications.

It should be noted that the PDP Context, as established through the signalling diagram shown in FIG. 1, is the granularity with which a certain Quality of Service (QoS) can be provided in a UMTS network. That is, packets from two different service, which are realized by two different QoS levels need to be mapped onto separate PDP contexts. It is therefore possible that multiple of the procedures shown in FIG. 1 need to be carried out for each UE depending on the number of QoS levels that need to be realized for that particular UE by the network.

Figure 2:
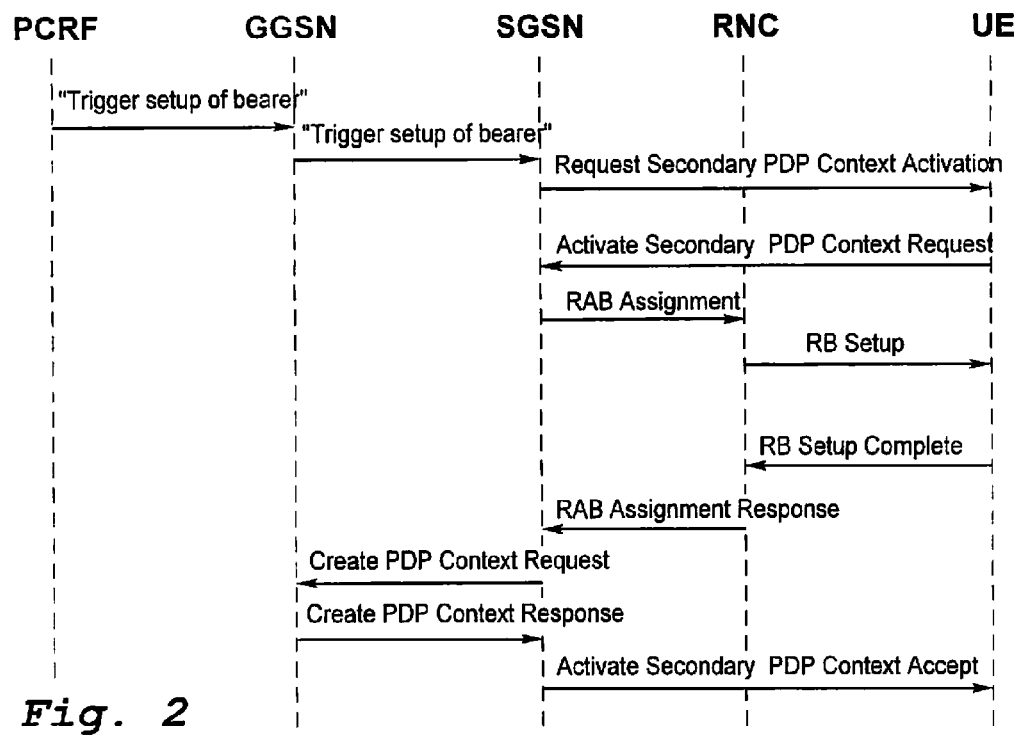
FIG. 2 illustrates the same procedure as in FIG. 1 according to a proposed amendment

FIG. 2 shows the communication between a user terminal and a UMTS network according to an amended procedure that has been proposed to be included in the relevant 3GPP specifications. The procedure is identical to the one shown in FIG. 1, but is preceded by a message from Policy Charging Rules Function (PCRF) unit in the network. According to the procedure illustrated in FIG. 2, a session can be initiated by the PCRF unit sending a message to trigger setup of a bearer, to the GGSN. The GGSN forwards this message to the SGSN, which sends a Request for secondary PDP context activation to the user terminal. In response, the user terminal sends the Activate secondary PDP Context request to the SGSN and the procedure continues as described in FIG. 1. The amendments give the network an enhanced level of control of when the procedures to set up the resources for communication should be triggered.

The PCRF unit is located above GGSN in the network and communicates with the GGSN through the Gx interface. The PCRF unit enables the operator to control various policies in the network, including:
  control charging
  authorize IP flows (gating), that is, deciding which IP flows are allowed into the system and which are denied
  control and achieve a predictable service delivery/service quality
  optimize the use of network resources The policy of enabling state transitions based on trigger events, or pre-establishment of bearers, according to the present invention could be seen as another policy that could be implemented in the PCRF unit.

To control network resources and battery consumption in the terminal, different Radio Resource Control (RRC) states have been introduced. These states enable a terminal to be idle or to communicate with the system on a suitable level, to reduce the use of resources when the terminal is not currently engaged in a communication session.

Figure 3:
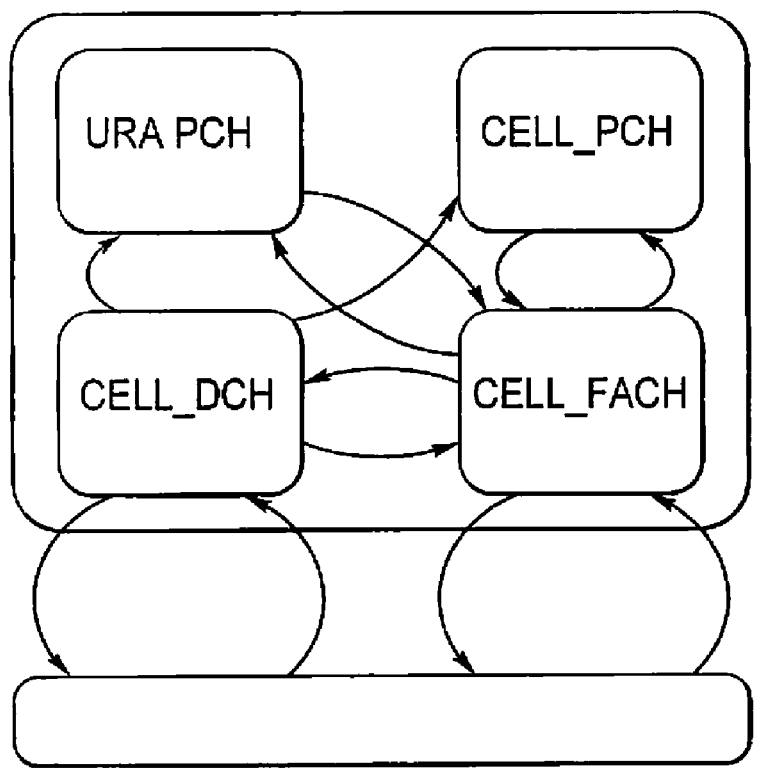
FIG. 3 illustrates the RRC states of a terminal in a WCDMA network

FIG. 3 illustrates the RRC states in a WCDMA network. In order to engage in data transfer the user terminal must be in one of the states CELL_FACH or CELL_DCH. In these states the terminal is known to the network, which means that the network maintains a state related to the terminal. Also, the terminal must listen to the FACH or a DCH in the downlink, which consumes battery resources. Hence, these states constitute costs for the system as well as for the terminal. Therefore, it is not desirable to remain in any of these states if no data is to be sent.

In the Idle Mode no data transfer is possible and the system cost for being in this state is minimal. The network does not keep any state of the user terminal and the terminal can only receive cell broadcast information.

In the state URA_PCH the system is aware of the terminal and knows that it is located in a particular cluster of cells, known as a UTRAN Routing Area (URA), but not exactly which cell the terminal is located in. The user terminal listens to the paging channel PCH. In the state CELL_PCH the system is aware of the terminal's location on cell level, and the terminal listens to the paging channel PCH. In the CELL_FACH state the terminal continuously monitors the FACH on the downlink. RACH and/or CPCH can be used at any time. The terminal's location is known on cell level. In the CELL_DCH state a DPCH channel has been allocated to the cell. Dedicated channels and or shared transport channels can be used.

This means that some communication is performed between the terminal and the network both in URA_PCH and in CELL_PCH, but in order to establish a communication session, the terminal must undergo a transition to the CELL_FACH state and, possibly, from this state to the CELL_DCH state. These transitions, from idle mode, URA_PCH or CELL_PCH to the modes in which communication is possible, typically take some time and will delay the setup of a communication session desired by the user.

While the above discussion of RRC states is related to WCDMA-based UMTS systems, the principle of defining different states applies to several types of network. It is likely that future telecommunications systems, such as Super-3G and 4G, will also have a number of states, defining what a terminal can do, and the use of network resources, in each state.

Figure 4:
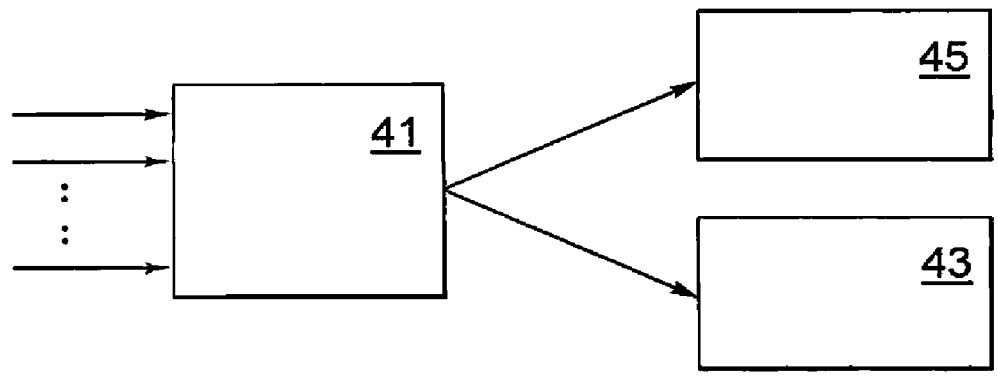
FIG. 4 illustrates the decision logic unit according to the invention.

FIG. 4 illustrates a decision logic unit 41 used in the telecommunications network according to the invention. The decision logic unit comprises at least one input for receiving at least one parameter related to a criterion for at least one subscriber in the network. The parameter or parameters received for a particular subscriber may be used to determine if, for this subscriber, a bearer should be pre-established, or the RRC state of the subscriber's terminal should be changed. The decision logic unit 41 comprises output means for sending a trigger to an RRC state change mechanism 43 and/or a bearer establishment mechanism 45, respectively.

The RRC state change mechanism 43 is arranged to initiate the signalling needed to change the state of the user's terminal to a state in which it is able to communicate, if triggered by the decision logic unit 41. It is preferably arranged in the RNC, since this is the node that handles RRC state changes according to the current UMTS system architecture. In other or future systems, however, another node may handle this functionality.

The bearer establishment mechanism 45 is arranged to initiate the signalling needed to establish a bearer on which the terminal can communicate if triggered by the decision logic unit 41. Usually, the terminal will have to be in the appropriate state before a bearer can be used. Therefore, if the terminal is in a state in which it is not able to communicate, such as URA_PCH, before a bearer is established, the RRC state of the terminal is usually changed to a state in which the terminal is able to communicate. In the example shown in FIG. 3, related to WCDMA, this state will be CELL_DCH or CELL_FACH. The bearer establishment mechanism is preferably arranged in the PCRF, in case the amended procedure shown in FIG. 2 is used.

As will be understood a distributed control system may be advantageous, where control units in different locations in the network are used for RRC state change and/or bearer establishment. Also such distributed control units may consider different input criteria dependent on their location in the network. In this way, the control units may be arranged in such a way as to minimize unnecessary communication in the network, and to utilize the functions already present in the network.

A mentioned above, this change of state takes some time and will be experienced by the user as a delay. A transition from the idle mode to CELL_FACH or CELL_DCH takes even longer.

The number of inputs to the decision logic unit can vary. In FIG. 4 N inputs are shown. In a special case only a single input is delivered to the decision logic.

As will be discussed in the following, different criteria may be used to trigger the state change and/or the establishment of a bearer, that is, different criteria may be used as input to the decision logic unit 41. Depending on the criteria used, it will be suitable to place the decision logic unit 41 in different parts of the network, to minimize the amount of communication needed between different units in the network. This will be discussed below.

As mentioned above, different criteria may be used for determining if a state change should be effected and/or a bearer should be set up. Some possible criteria will be discussed in the following. In any particular telecommunications system, one or more of these criteria may be applied, individually or in combination. Further, the operator may decide to offer the service of state change and/or pre-establishment of bearers only to a certain group of subscribers, for example, premium rate subscribers. As the skilled person will realize, other criteria than the ones listed below can be applied as well, by themselves or in combination with one or more of the criteria discussed in this document.

In a preferred, location based, embodiment the decision logic uses the location of a particular user to decide if a state change should be made, and/or a bearer should be pre-established for this user's terminal. This embodiment may be useful, for example, if a user is located in a football stadium where a service provider offers an instant replay video service. In such a scenario, the mobile operator may choose to pre-establish the communication resources needed to realize this video service so that the video service can be initiated quickly.

Another example could be in an airport lounge, where users are likely to use their mobile terminals, for example, for voice telephony or web browsing. In this case the network could trigger the change of state and/or the pre-establishment of one or more bearers when a user enters the cell covering the airport lounge.

In a second, history-based embodiment, each time a service is invoked by a user, the decision logic receives information about the service that was invoked, and the decision logic also notes the time of this invocation. From this, user patterns can be inferred, which may be used to predict user behaviour. In this way, if a user usually performs the same action at approximately the same time every day, the system can predict this and initiate a state change and/or pre-establish a bearer shortly before the user will need it.

In a third, terminal-based embodiment the decision logic uses input from one or multiple sensors in a terminal to decide whether to change the state, or pre-establish a bearer for that particular terminal. For example, use of the address book in the terminal could be monitored. If the address book is browsed this may be an indication that the user intends to initiate a communication session. As another example, the terminal could be provided with a motion sensor. If a terminal moves this may be seen as an indication that it is about to be used for communication purposes.

In a fourth, service-based embodiment the use of the inventive functions may be based on the use of a particular service. In the future, services offered in mobile networks may consist of multiple service components, each requiring separate treatment in the mobile network. One example of such a service is Ericsson's WeShare, which combines a traditional voice component with video, chat and whiteboard functionality. Packets from each of these service components may be mapped onto a different bearer (or PDP context). In this service-based embodiment an operator may specify a policy that once the bearer for one of these components is established, for example, upon explicit request from the user, further bearers can be pre-established to cater for other service components that have not been requested yet.

For example, once the user places a WeShare voice call the bearer for the video service component is automatically pre-established, so that in case a video component is added to the session, the perceived session setup time will be decreased.

A fifth embodiment is based on the system load. The system load is used as input to the decision logic to determine whether to pre-establish a bearer for a particular user. In this context, the system load could be any quantity indicative of the current utilization of resources in the system. One such example is the memory consumption in the network node that needs to allocate memory for an established bearer. If this memory consumption is currently low, the decision logic may decide to pre-establish one or more bearers for certain users. This load-based embodiment is particularly advantageous as an additional criterion for one or more of the embodiments discussed above. In this case, if it is determined that a terminal's state should be changed, and/or a bearer be pre-established, based on one of the previous embodiments, the system load can be determined. If the system load is above a certain threshold, the state will not be changed and no bearer will be established, before the user actively initiates a communication session.

As mentioned above the decision logic unit 41 may be placed in different locations in the network depending on the types of parameters used to determine if a state change is to be made and/or a bearer should be set up. For example, if the geographical location of the mobile terminal is to be used as input, it will be feasible to place the decision logic in or near the Radio Network Controller (RNC), which has knowledge about the terminal's position. If the decision logic is placed in another node in the network position information must be transmitted to this other node.

If the service based embodiment is used, it will be feasible to place the decision logic in or near the Policy Charging Rules Function (PCRF) unit.

It will also be possible to use a distributed implementation of the decision logic, that is, to make each decision in the node where it is most feasible. For example, the decision logic that triggers RRC state change mechanisms may be placed in the RNC and the decision logic that triggers bearer establishment can be placed in the PCRF.

In the future, it is likely that the number of radio bearer realizations will decrease compared to today's UMTS systems. This means that a limited number of bearer realizations will be used to realize the Quality of Service (QoS) requirements imposed by different services. In the extreme case, a single radio bearer realization can be used to support all conceivable services, that is, the configuration of the bearer will be identical for all bearer types. Instead, different QoS requirements can be fulfilled by assigning different scheduling priorities to the different bearers which carry packets stemming from different services.

In such a scenario the network could keep one extra bearer pre-established for each user terminal in anticipation that the user invokes a new service. Once a service is invoked for which the network does not have an appropriate bearer established, the network dynamically assigns a scheduling priority to the bearer. This priority may be set based on the QoS requirements of service that was invoked. For example, a VoIP service will be assigned a higher scheduling priority than a file download service. Once the pre-established bearer is in use, the decision logic may choose to trigger the pre-establishment of a new radio bearer in anticipation of the user invoking yet another service with yet another QoS requirement than those provided by the bearers that the network currently has established.

The number of bearers that can be assigned to any one user can be limited. For example, if the user has only subscribed to M services and these services contain service components which require N different QoS levels, the decision logic would only decide to trigger another pre-established bearer if the number of services currently used is smaller than N, since in that case N is the maximum number of bearers that this user can have established simultaneously.

In this way, there is always a pre-established bearer ready for use when a service is invoked, but the number of pre-established bearers is reduced to a minimum. The input to the decision logic in this case would be the number of distinct bearers needed to realize the services that a user has subscribed to (N) and the number of bearers that have been established and are currently in use (K). Of course, this last embodiment can also be combined with information about the current system load to determine if bearers may be pre-established at all. The decision may also be based on the individual user, for example in dependence of the type of subscription.

The invention claimed is:

1. A control unit for use in a wireless communication network for controlling a user terminal's ability to communicate with the network, comprising:
at least one input means for receiving event information about at least one trigger event indicating that the user terminal is likely to wish to communicate with the network within a predetermined period of time;
a decision logic, in response to the trigger event, for deciding whether a current state of the user terminal should be changed to enable the user terminal to communicate with the network, wherein the decision logic is further configured to decide whether the current state should be changed based on a number of radio bearers needed for services to which the user terminal has subscribed and a number of bearers that have already been established for the user terminal; and
an output means for triggering a state change for the user terminal change to a new state in which the user terminal is able to communicate with the network, when the decision logic decides that the state of the of the user terminal should be changed.

2. The control unit of claim 1, further comprising at least one input for load information about a current traffic load in the network, wherein the decision logic is arranged to consider said load information when deciding whether the current state of the user terminal should be changed.

3. The control unit of claim 1, wherein said at least one trigger event concerns the user terminal's geographical location.

4. The control unit of claim 1, wherein said at least one trigger event concerns an activity performed by the user terminal.

5. The control unit of claim 1, wherein said at least one trigger event is based on the user terminal's previous behaviour.

6. The control unit of claim 1, further comprising an output for triggering an establishment of at least one bearer for the user terminal when the decision logic determines that the current state of the user terminal should be changed.

7. The control unit of claim 1, wherein the control unit is arranged to be included in a unit that manages bearer set-up functions in the wireless communication network, such as a Policy and Charge Rules Function, PCRF, unit.

8. The control unit of claim 1, wherein the control unit is arranged to be included in a unit that manages radio resource functions in the wireless communication network.

9. A wireless communication network comprising:
a network node configured to manage radio resource functions in the wireless communication network;
a user terminal configured to communicate with the wireless communication network, wherein at least one of the network node and the user terminal comprises a control unit for controlling the user terminal's ability to communicate with the network, and wherein the control unit is configured to:
  detect at least one trigger event related to a user terminal, indicating that the user terminal (UE) is likely to wish to communicate with the network within a predetermined period of time, wherein the trigger event relates to at least one of a number of radio bearers needed for services to which the user terminal has subscribed and a number of bearers that have already been established for the user terminal;
  decide, based on the number of radio bearers needed for services to which the user terminal has subscribed and the number of bearers that have already been established for the user terminal, that a current state of the user terminal should be changed to a new state in which the user terminal is able to communicate with the network; and
triggering a state change for the user terminal to the new state in which the user terminal is able to communicate with the network, in response to determining that the current state of the user terminal should be changed.

10. A method in a wireless communication network comprising the steps of
  detecting at least one trigger event related to a user terminal, indicating that the user terminal is likely to wish to communicate with the network within a predetermined period of time, wherein the at least one trigger event relates to at least one of a number of radio bearers needed for services to which the user terminal has subscribed and a number of bearers that have already been established for the user terminal;
  deciding, based on the number of radio hearers needed for services to which the user terminal has subscribed and the number of bearers that have already been established for the user terminal, that a current state of the user terminal should be changed to a new state in which the user terminal is able to communicate with the network; and
  changing the current state of the user terminal to the new state in response to deciding that the current state of the user terminal should be changed.

11. The method according to claim 10, further comprising at least one input for load information about the current traffic load in the network, wherein the decision logic is arranged to consider said load information when deciding.

12. The method according to claim 10, wherein said at least one trigger event concerns the user terminal's geographical location.

13. The method according to claim 10, wherein said at least one trigger event concerns an activity performed by the user terminal.

14. The method according to claim 10, wherein said at least one trigger event is based on the user terminal's previous behaviour.

15. The method according to claim 10, further comprising the step of triggering an establishment of at least one bearer for the user terminal when the decision logic determines that the state of the user terminal should be changed.

* * * * *

UNITED STATES PATENT AND TRADEMARK OFFICE
CERTIFICATE OF CORRECTION

PATENT NO. : 8,200,236 B2  Page 1 of 1
APPLICATION NO. : 12/280958
DATED : June 12, 2012
INVENTOR(S) : Ekström et al.

It is certified that error appears in the above-identified patent and that said Letters Patent is hereby corrected as shown below:

In Column 4, Line 45, delete "resources" and insert -- resources. --, therefor.

In Column 8, Line 55, in Claim 1, delete "of the of the" and insert -- of the --, therefor.

In Column 10, Line 4, in Claim 10, delete "of" and insert -- of: --, therefor.

Signed and Sealed this
Thirteenth Day of November, 2012

David J. Kappos
*Director of the United States Patent and Trademark Office*